(No Model.)
G. M. PETERS.
DIE FOR MAKING DASH FRAMES.
No. 281,553. Patented July 17, 1883.
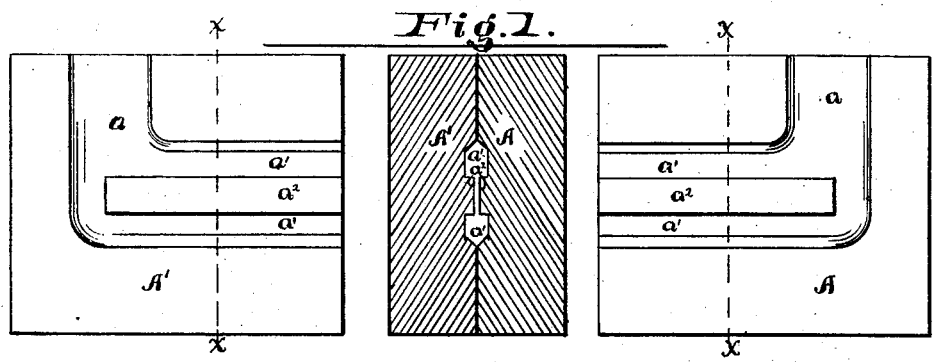
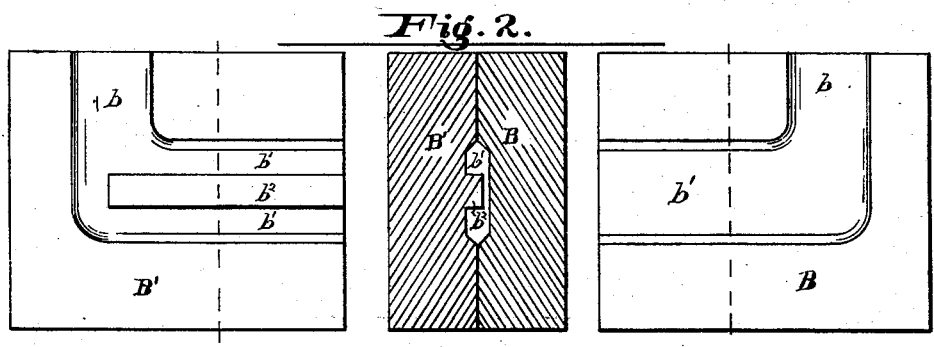
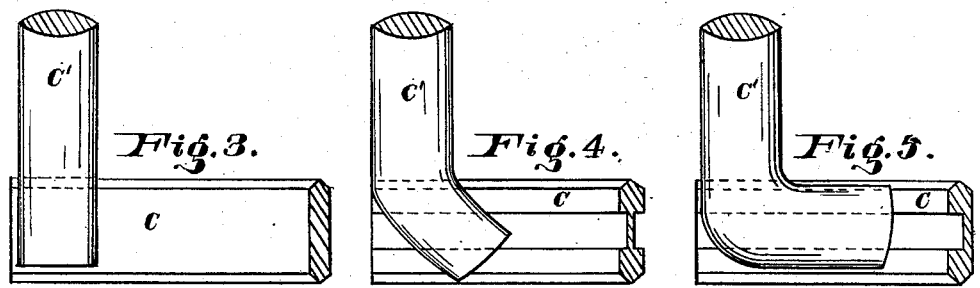
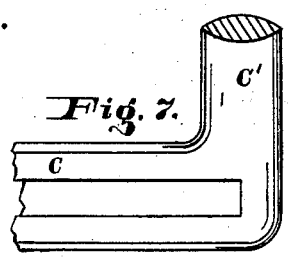
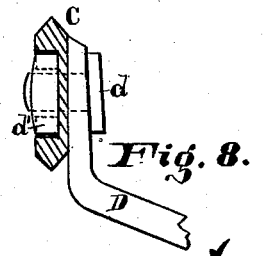
Attest.
J. Wm. Strehli
E. R. Hill
Inventor.
George M. Peters
per Wm. Hubbell Fisher
Atty.

UNITED STATES PATENT OFFICE.

GEORGE M. PETERS, OF COLUMBUS, OHIO.

DIE FOR MAKING DASH-FRAMES.

SPECIFICATION forming part of Letters Patent No. 281,553, dated July 17, 1883.

Application filed December 7, 1880. (No model.)

*To all whom it may concern:*

Be it known that I, GEORGE M. PETERS, of the city of Columbus, in Franklin county, and State of Ohio, have invented certain new and useful Improvements in the Manufacture of Dash-Frames, of which the following is a specification.

The principal object of my invention is to provide an efficient and useful method of welding the end bars of a metal dash-frame to the bottom rail, and a method by which the bottom rail of the dash is strengthened at the weld and at the portion of said rail to which the dash-foot is to be attached.

Another object of my invention is to provide a means by which a recess is formed in the bottom rail, preparatory to punching said rail, to receive the bolt or other attachment which secures the dash-foot to the bottom rail, the operation of forming the recess being performed at the same time that the end bar is welded to the bottom rail.

The several features of my invention and the various advantages arising from them, when used together or otherwise, will be hereinafter more fully set forth.

That portion of my invention which relates to dash-frame corners such as can be produced by means hereinafter described is covered by claims which formed a part of this specification, and which now, at the direction of the Hon. Commissioner of Patents, have been transferred to and form part of an application for Letters Patent of which this is a division.

Referring to the drawings forming part of this specification, Figures 1 and 2 represent two different sets of dies for welding the end bar to the bottom rail of a dash-frame. Each of these figures represents the upper and lower die, and also shows the dies placed face to face, as they are when the weld is completed. Figs. 3, 4, and 5 represent different forms in which the end of the end bar may be made and the relative position in which it is placed with reference to the bottom rail of the frame preparatory to welding. Fig. 6 is a view, looking down on one end, of the lower rail, showing its appearance after the end bar has been welded to it by the use of my invention. Fig. 7 represents the lower corner of a dash-frame, showing a recess in the lower rail as made by the use of my invention. Fig. 8 represents a section of the lower rail of a dash with a dash-foot attached, showing a recess in said rail sufficiently wide and deep to receive the nut which secures the dash-foot to the rail.

In Fig. 1, A represents the lower die, and A' the upper die. In the center of the figure the dies are shown in section, said section being taken through the dotted lines $x\ x$. The dies A and A' are provided with channels or depressions $a$ to receive the end bar of the frame, and $a'$ to receive the bottom rail. The channels $a$ and $a'$ of the die A coincide with the like channels in the die A' when the two dies are placed together, as in the center of Fig. 1.

From the bottom of the depressions $a'$ in the dies A and A' rise the tongues $a^2$, which, like the depressions $a$, coincide with each other when the two dies are placed together. These tongues $a^2$ preferably do not rise quite to the level of the face of the dies, so that when the dies are placed together a slight space will be left between the two tongues, as shown.

I preferably so form the tongues $a^2$ that when the dies A and A' are placed together said tongues will approach closer to each other at that portion of themselves which forms that portion of the web in the lower bar which is to be punched through to receive the bolt or other device whereby the dash-frame is connected to the foot or vehicle, than at any other point. The object of such a formation of the tongues is to make the web left in the bottom rail thinner in that portion of said rail where perforations are to be made to receive the bolts which secure the dash-foot to the frame, substantially as shown by the dotted lines in Fig. 6, this web being in other portions preferably left of a uniform thickness. One of the objects of thus making the web thin, as described, is to enable it to be more readily punched or otherwise perforated. By means of these dies a recess is formed in either side of the bottom rail, which recess corresponds with the tongues $a^2$ of the dies. Fig. 2 represents a slightly-different form of dies, B representing the lower die, and B' the upper die, the two dies being placed face to face, and shown in section in the middle of the figure, said section being taken through the lines $y\ y$. The die B' is formed like the die A', having the depressions $b\ b'$, corresponding to the depressions $a$ and $a'$, with the exception that the tongue $b^2$, springing from the bottom of depression $b'$, and corresponding to the tongue $a^2$, projects slightly beyond the face of the die B'.

The die B has the depressions $b\ b'$, which correspond to the depressions $a\ a'$ of the die A, and which coincide with the like depressions in the die B' when the two dies are placed together, as in the center of Fig. 2. The depression $b'$ in the die B is not provided with a tongue, as is the case with the depression $a'$, but in all other respects the die B is like the die A. By means of the dies B and B' a recess is formed in one side of the bottom rail of the dash-frame corresponding to the tongue $b^2$ of the die B'; but the die B having no corresponding tongue, no recess is formed in the side of the bottom rail against which the die B presses, as will be obvious from the sectional view in Fig. 2.

In some instances it will be desirable to make the tongue $b^2$ or tongue $a^2$ proportionately broader than is shown in Fig. 2, in order to form the recess in the bottom rail of the frame sufficiently wide to receive the nut into which the bolt which secures the dash-foot to the frame is screwed, as illustrated in Fig. 8, in which figure C represents the bottom rail of the dash-frame; D, the dash-foot; $d$, the bolt which secures the foot to the frame, and $d'$ the nut into which said bolt is screwed.

Instead of the continuous tongues $a^2\ b^2$, a row or series of studs may be used to form a number of smaller recesses which may be readily converted into perforations to receive the bolt which secures the dash-foot to the frame; but this latter construction is not so desirable as the continuous tongue, for the reason that where studs instead of a tongue are used perforations can only be made at definite points, and the lateral adjustability of the foot will not be so perfect as it is when the continuous tongue is used, as by the use of the latter perforations can be made at any point in the recess formed by said tongue. Another reason why a continuous tongue is preferable to such studs is because the latter are liable to be more rapidly worn down in use than the tongue. If a continuous tongue be employed, it need not necessarily be so long as is herein described; but its length may be varied to suit the manufacturer. These tongues may, if desired, be made of such a shape as to form a recess with a concave bottom, instead of the shape herein described.

When the end bar is to be welded to the bottom rail, it (the end bar) may be left straight, as shown in Fig. 3; but I preferably bend the lower end of the end bar, as shown in Figs. 4 and 5, before welding, in order to have more metal at the point of unison, and also that the grain of the end of the end bar may run parallel to the grain of the bottom rail, thereby securing a more perfect weld. By the use of my invention this surplus metal is forced to the upper and lower side of the recess formed by the tongue $a^2$ or $b^2$, thickening the bottom rail at these points, as shown in Fig. 6, and strengthening it at the point where most strength is needed—viz., at the point of welding—and the portion to which the dash-foot is to be attached. I am thereby enabled to use a much lighter bottom rail and throughout the balance of the frame than I otherwise could do. To enable this bottom rail to be thickened at the points above mentioned, the bottoms of the recesses $a'$ and $b'$ in the dies are preferably deepened toward and at the point where they respectively meet the vertical recesses $a$ and $b$. The bottom rail, previous to the welding to it of the end bar, may be either a round or oval bar, or of any desirable shape, or a plain bar without channel, as in Fig. 3, or a bar channeled on both sides, as in Fig. 4, or channeled on one side only, as in Fig. 5, in either of which cases the corner of the frame will present the appearance represented in Figs. 6 and 7, or any similar or other special form desired, if the dies are so made, having a recess on one or both sides of the lower rail, according as the dies B B' or A A' are used. If the lower rail to be used is channeled on one or both sides previous to welding, the tongue $a^2$ or $b^2$ will not permit the channel to be obliterated wholly or partially when the end bar is welded to the bottom rail; but, as before stated, the surplus metal obtained by the lap, or, if the tongue is placed so far away from the lap as not to touch it, from the metal pressed out by the tongue as it penetrates or sinks into the bar, is forced to the upper and lower sides of the channel. When the end bar and bottom rail are to be welded together, the ends of both are brought to the required degree of heat and placed between the dies, which are then brought forcibly together, which welds the two ends together and forms the recess in one or both sides of the bottom rail, as before stated, at one operation.

Should the manufacturer desire, he may place the tongue $a^2$ so far away from the point of welding that none of the surplus metal of the lap will be pressed into the lower rail at the sides of the depression made by the tongue; yet if the part, where the depression or channel is to be made be located near enough to the end of the lower rail where the weld is to be made, to be heated at the same heat with which the weld is to be made, the tongue would be of value in forming a channel, or in preserving a channel already formed, in the lower rail, and in reducing the thickness of the web in the lower rail, where the perforations are expected to be made.

What I claim as new and of my invention, and desire to secure by Letters Patent, is—

1. The combination, substantially as before set forth, of the two dies having opposing angularly-joined depressions $a\ a'$, and a tongue, $a^2$, in the depression $a'$ of either or both dies.

2. The combination, substantially as before set forth, of the two dies having opposing angularly-joined depressions $a\ a'$, and a tongue, $a^2$, in the depression $a'$ of either or both dies, the depressions $a'$ deepening toward their junctions with the depressions $a$.

3. The combination, substantially as before set forth, of the dies having opposing angularly-joined depressions $a\ a'$, and a tongue, $a^2$, in either or both of the said depressions, the face of said tongue or tongues being inclined.

4. The combination, substantially as before set forth, of the dies having opposing angularly-joined depressions $a\ a'$, and a tongue, $a^2$, in either or both of the said depressions, the depressions $a'$ deepening toward their junctions with the depressions $a$, and the face of the tongue or tongues being inclined.

GEORGE M. PETERS.

Witnesses:
  A. S. LUDLOW,
  E. R. HILL.